United States Patent
Seovic et al.

(10) Patent No.: US 10,095,508 B2
(45) Date of Patent: Oct. 9, 2018

(54) SYSTEM AND METHOD FOR SUPPORTING DYNAMIC DEPLOYMENT OF EXECUTABLE CODE IN A DISTRIBUTED COMPUTING ENVIRONMENT

(71) Applicant: Oracle International Corporation, Redwood Shores, CA (US)

(72) Inventors: Aleksandar Seovic, Tampa, FL (US); Harvey Raja, Manchester (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 353 days.

(21) Appl. No.: 14/864,558

(22) Filed: Sep. 24, 2015

(65) Prior Publication Data
US 2016/0092205 A1 Mar. 31, 2016

Related U.S. Application Data

(60) Provisional application No. 62/055,482, filed on Sep. 25, 2014, provisional application No. 62/076,159, filed on Nov. 6, 2014.

(51) Int. Cl.
*G06F 9/44* (2018.01)
*G06F 8/658* (2018.01)
(Continued)

(52) U.S. Cl.
CPC .............. *G06F 8/658* (2018.02); *G06F 8/68* (2013.01); *G06F 8/71* (2013.01); *G06F 9/44521* (2013.01);
(Continued)

(58) Field of Classification Search
CPC ....... G06F 9/445521; G06F 2009/4557; G06F 8/68; G06F 9/5072; G06F 8/658
See application file for complete search history.

(56) References Cited

U.S. PATENT DOCUMENTS

| 5,974,428 A | 10/1999 | Gerard |
| 6,119,145 A | 9/2000 | Ikeda et al. |

(Continued)

OTHER PUBLICATIONS

European Patent Office, International Searching Authority, International Search Report and Written Opinion dated Jan. 12, 2016 for International Application No. PCT/US2015/052060, 14 pages.

(Continued)

*Primary Examiner* — Marina Lee
(74) *Attorney, Agent, or Firm* — Tucker Ellis LLP (57) ABSTRACT

A system and method supports dynamic deployment of executable code in a distributed computing environment. A server node in the distributed computing environment can receive a class definition from a client to execute, and generate and load into memory an instance of a class using said class definition without restarting or redeploying the server node. The class definition can define a new or updated class otherwise unavailable to the server node. Classes are identified with unique class identities which enables determination of whether a class is new or updated. The class identity can be used to determine the need for transmitting a class definition to a server node and also to ensure that a correct version of a class in implemented. In a particular case the new or updated class definition implements a lambda expression.

20 Claims, 5 Drawing Sheets

(51) Int. Cl.
*G06F 8/71* (2018.01)
*G06F 9/445* (2018.01)
*G06F 9/50* (2006.01)
*G06F 9/455* (2018.01)

(52) U.S. Cl.
CPC .... *G06F 9/5072* (2013.01); *G06F 2009/4557* (2013.01)

(56) References Cited

U.S. PATENT DOCUMENTS

| | | | |
|---|---|---|---|
| 6,898,618 B1* | 5/2005 | Slaughter | G06F 9/465 709/203 |
| 6,925,638 B1 | 8/2005 | Koved et al. | |
| 7,016,966 B1* | 3/2006 | Saulpaugh | H04L 67/16 709/203 |
| 7,200,848 B1* | 4/2007 | Slaughter | H04L 63/101 709/202 |
| 7,207,002 B2* | 4/2007 | Mireku | G06F 17/2247 715/234 |
| 7,873,592 B2 | 1/2011 | Meijer | |
| 8,082,491 B1* | 12/2011 | Abdelaziz | G06F 9/465 709/201 |
| 9,110,711 B2* | 8/2015 | Abdelaziz | G06F 9/465 |
| 9,201,701 B2* | 12/2015 | Boldyrev | G06F 9/5072 |
| 9,524,323 B2* | 12/2016 | Meek | G06F 8/427 |
| 2001/0044790 A1 | 11/2001 | Taivalsaari | |
| 2005/0229048 A1 | 10/2005 | Da Palma | |
| 2006/0206876 A1 | 9/2006 | Barton | |
| 2006/0212847 A1 | 9/2006 | Tarditi | |
| 2007/0044083 A1 | 2/2007 | Meijer et al. | |
| 2008/0178140 A1 | 7/2008 | Lin | |
| 2008/0282266 A1 | 11/2008 | Kabanov | |
| 2009/0144714 A1 | 6/2009 | Fan et al. | |
| 2009/0265688 A1 | 10/2009 | Govereau et al. | |
| 2009/0320045 A1 | 12/2009 | Griffith | |
| 2009/0328013 A1 | 12/2009 | Aharoni | |
| 2009/0328016 A1 | 12/2009 | Maly | |
| 2010/0088686 A1 | 4/2010 | Langworthy | |
| 2010/0191930 A1 | 7/2010 | Groff et al. | |
| 2010/0257507 A1 | 10/2010 | Warren | |
| 2011/0202906 A1 | 8/2011 | Asao | |
| 2012/0072917 A1* | 3/2012 | Boldyrev | G06F 9/5072 718/104 |
| 2012/0079368 A1* | 3/2012 | Abdelaziz | G06F 9/465 715/234 |
| 2012/0079464 A1 | 3/2012 | De Smet | |
| 2013/0125101 A1 | 5/2013 | Pamer | |
| 2013/0132070 A1 | 5/2013 | Dayan | |
| 2013/0159981 A1 | 6/2013 | Klemenz | |
| 2014/0067871 A1* | 3/2014 | Meek | G06F 8/427 707/797 |
| 2014/0129719 A1 | 5/2014 | Weber | |
| 2014/0359043 A1 | 12/2014 | Gao | |
| 2015/0301809 A1 | 10/2015 | Goetz | |
| 2016/0092205 A1* | 3/2016 | Seovic | G06F 8/68 717/170 |
| 2016/0147547 A1 | 5/2016 | Elias | |
| 2017/0006129 A1* | 1/2017 | Raja | H04L 67/2842 |

OTHER PUBLICATIONS

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

Goetz, Brian, State of the Lambda, Dec. 2011, 4th edition, 10 pages, retrieved Apr. 2, 2015 from: <http://cr.openjdk.java.net/~briangoetz/lambda/>.

Skorkin, Alan, "Closures—A Simple Explanation (Using Ruby)", May 18, 2010, 7 pages, retrieved Jan. 20, 2016 from: <http://www.skorks.com/2010/05/closures-a-simple-explanation-using-ruby/>.

Axelsen, Eyvind W. et al., "Groovy Package Templates: Supporting Reuse and Runtime Adaption of Class Hierarchies", Oct. 29, 2009, Orlando, Florida, USA, Copyright © 2009 ACM, 12 pages, retrieved Jan. 20, 2016 from: <http://heim.ifi.uio.no/~eyvinda/publications/axelsen09dls.pdf>.

Costan, Victor et al., "The Trusted Execution Module: Commodity General-Purpose Trusted Computing", G. Grimaud and F.-X. Standaert (Eds.): CARDIS 2008, LNCS 5189, pp. 133-148, 2008, © IFIP International Federation for Information Processing 2008, retrieved Jan. 20, 2016 from: <http://people.csail.mit.edu/devadas/pubs/cardis08tem.pdf>.

United States Patent and Trademark Office, Notice of Allowance and Fee(s) Due dated Sep. 19, 2016 for U.S. Appl. No. 13/779,536, 11 Pages.

Hinkel, Frank. "Software Engineering, Architecture." N.P., Nov. 28, 2012. Web. Sep. 21, 2016, 8 Pages.

Box, Don. "LINQ:.Net Language-Integrated Query." N.P., Feb. 2007. Web. Sep. 21, 2016, 32 Pages.

Hejtmanek, Martin. "From Developers to Developers." N.P., Dec. 6, 2011. Web. Sep. 21, 2016, 11 Pages.

United States Patent and Trademark Office, Office Action dated May 17, 2016 for U.S. Appl. No. 13/779,536, 22 Pages.

* cited by examiner

SYSTEM AND METHOD FOR SUPPORTING DYNAMIC DEPLOYMENT OF EXECUTABLE CODE IN A DISTRIBUTED COMPUTING ENVIRONMENT

CLAIM OF PRIORITY

This application claims priority to U.S. Provisional Patent Application No. 62/055,482, entitled "SYSTEM AND METHOD FOR SUPPORTING DYNAMIC LAMBDAS IN A DISTRIBUTED COMPUTING ENVIRONMENT" filed Sep. 25, 2014, and U.S. Provisional Patent Application No. 62/076,159, entitled "SYSTEM AND METHOD FOR SUPPORTING DYNAMIC LAMBDAS IN A DISTRIBUTED COMPUTING ENVIRONMENT" filed Nov. 6, 2014, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed computing environment.

SUMMARY

The present disclosure describes systems and methods that can support dynamic deployment of executable code in a distributed computing environment. A client generates a class definition for one or more class or updated class. The class definition is serialized and transmitted to a server in the distributed computing environment. The server in the distributed computing environment receives the serialized class definition, deserializes the class definition and generates the one or more class or updated class on the server for execution. The class or updated class may represent a lambda expression. Furthermore, the class or updated class is provided with a unique identity to ensure that a correct class or class version is executed and that a class definition that is unavailable on the server is serialized and distributed. Dynamic deployment of executable code enables execution of an agent on the server node where the agent depends on a new class definition otherwise unavailable to the server node.

In an embodiment, the present disclosure describes a method for supporting lambda expressions in a distributed computing environment. The method includes receiving, via a server, a class definition implementing a lambda expression. The client generates said class definition implementing a lambda expression, serializes it and sends it to the server. The server defines a lambda class based on the received class definition. If the lambda expression is updated on the client side, a new class definition representing the updated lambda expression is sent to the server.

These and other objects and advantages of the present invention will become apparent to those skilled in the art from the following description of the various embodiments, when read in light of the accompanying drawings.

DETAILED DESCRIPTION

Described herein are systems and methods which support dynamic deployment of executable code in a distributed computing environment. A server node in the distributed computing environment can receive a class definition from a client to execute and generate and load into memory an instance of a class using said class definition without restarting or redeploying the server node. The class definition can implement a new or updated class definition otherwise unavailable to the server node. Classes are identified with unique class identities which enable determination of whether a class is new or updated. The class identity can be used to determine the need for transmitting the class definition to a server node and also to ensure that a correct version of a class is implemented. Dynamic deployment of executable code enables execution of an agent on the server node where the agent depends on a new class definition otherwise unavailable to the server node.

In a particular embodiment, the present disclosure describes systems and methods that can support dynamic deployment of class definitions implementing lambda expressions in a distributed computing environment. A server in the distributed computing environment can receive from a client one or more class definition, wherein the client generates said one or more class definition to implement a lambda expression. Then, the server can define a lambda class on the server side based on the received class definition. Furthermore, when the lambda expression is updated on the client side a new class definition for the updated lambda class can be prepared and sent from the client to the server.

The systems and methods for supporting dynamic deployment of executable code including dynamic deployment of class definitions implementing lambdas as described herein and illustrated in FIGS. 2A, 2B, 3A, and 3B have particular utility in the distributed data grid described below with respect to FIG. 1. The systems and methods for supporting dynamic deployment of executable code including dynamic deployment of class definitions implementing lambdas may also be applied in wide variety of alternative distributed computing environments.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

Figure 1:
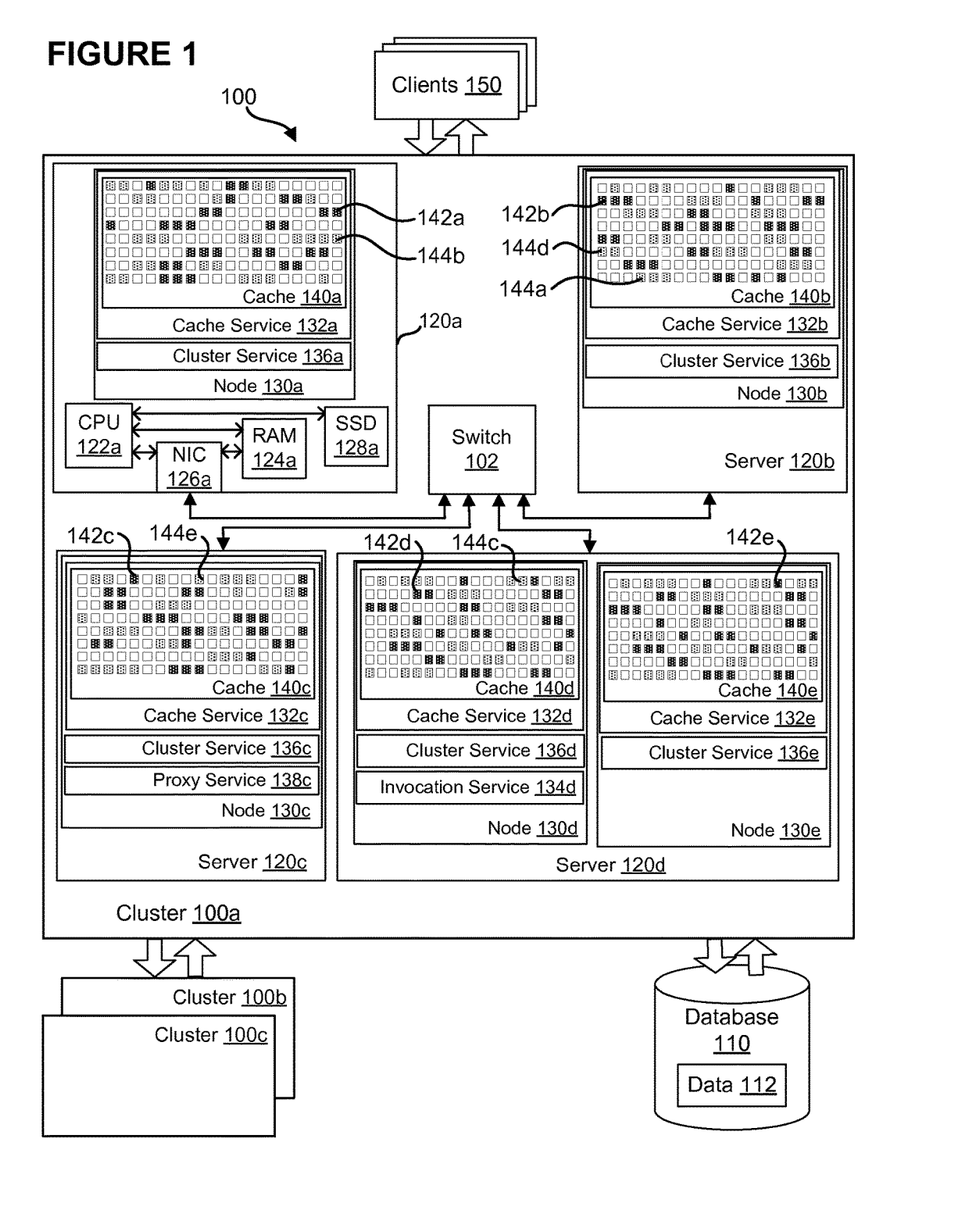
FIG. 1 illustrates a distributed data grid, in accordance with an embodiment of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is a Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Code Execution in a Distributed Data Grid

In embodiments, the distributed data grid supports the use of agents to perform operations on the nodes of the distributed data grid. For partitioned data, the agent can be configured to execute on the node (or nodes) that owns the data to execute against. Queuing, concurrency management, agent execution, data access by the agent and data modification by the agent all occur on that grid node. (Only the synchronous backup of the resultant data modification, if any, requires additional network traffic.) For many processing purposes, it is much more efficient to provide the agent to the node than to handle distributed concurrency control, coherency and data updates. In other words, the Data Grid determines the location to execute the agent based on the configuration for the data topology, moves the agent there, executes the agent (automatically handling concurrency control for the item while executing the agent), backs up the modifications if any, and returns a result.

An entry processor is one example of an agent used to perform an operation on the nodes of the distributed data grid. Other examples of agents/executable code include, but are not limited to: aggregators, filters, value extractors, and invocables. For example an Oracle® Coherence data grid supports a lock-free programming model through the Entry-Processor API. Advantageously, an entry processor performs an implicit low-level lock on the entries it is processing, thereby allowing the client to place processing code in an entry processor without having to worry about concurrency control. An entry processor can be invoked on a specific key, on a collection of keys, or on a Filter (the Filter is executed against the cache entries and each entry that matches the Filter criteria has the entry processor executed against it). Entry processors are executed in parallel across the cluster (on the nodes that own the individual entries.) This provides a significant advantage over having a client lock all affected keys, pull all required data from the cache, process the data, place the data back in the cache, and unlock the keys. The processing occurs in parallel across multiple computers (as opposed to serially on one computer) and the network overhead of obtaining and releasing locks is eliminated. The code of the entry processor for execution against the chosen entries is transmitted into the distributed data grid. For many transaction types, the use of entry processors minimizes contention and latency and improves system throughput, without compromising the fault-tolerance of data operations.

For example, an agent can be created on a client 150 of the distributed data grid 100 shown in FIG. 1. In order to execute the agent, the agent is serialized and transmitted to one or more node in the distributed data grid 100. To serialize an object means to convert its state to a byte stream so that the byte stream can be reverted back (deserialized) into a copy of the object. Deserialization is the process of converting the serialized form of an object back into a copy of the object. The Java platform specifies a default way by which serializable objects are serialized. A (Java) class can override this default serialization and define its own way of serializing objects of that class. When an object is serialized, information that identifies its class is recorded in the serialized stream. However, the class's definition ("class file") itself is typically NOT recorded. It is typically the responsibility of the system (for example the server) that is deserializing the object to determine how to locate and load the necessary class files.

A problem may arise where the agent utilizes a class definition ("class file") which is not available on a node of the distributed data grid upon which it is desired to realize the agent. In this situation, the agent will fail to operate on the node because the necessary class cannot be found by the node on which the agent is attempting to operate. Another problem may arise where the class definition is different on the client than it is on the node. For example, a class definition may have been modified/updated on the client but not modified/updated on the nodes of the distributed data grid. In this situation, the agent may operate because the necessary class is found on the node, however, the agent may not operate as intended because it utilizes a different class definition than intended by the creator of the agent. In prior embodiments, where new or updated class files were deployed on a client, it was necessary redeploy and restart nodes in the distributed data grid to support those new or updated class files before they could be utilized by agents operating in the distributed data grid. This is very cumbersome and time consuming for large clusters.

In embodiments, the distributed data grid 100, overcomes these problems by implementing a system and method for supporting dynamic deployment of new or updated class definitions from the client 150 to nodes of the distributed data grid 100 for execution in agents. Additionally, the distributed data grid 100 implements version control for class definitions to ensure that a class called by an agent (such as an entry processor) has the same class definition as the class on the client 150 where the agent was prepared. Utilizing the system and method for supporting dynamic deployment of class definitions and version control for class definitions increases the utility of the distributed data grid because it allows new or updated class definitions to be correctly be executed on nodes of the distributed data grid. Furthermore, avoiding the need to redeploy and restart nodes in the distributed data grid to support new or updated class definitions improves performance of the distributed data grid.

Dynamic Deployment of Class Definitions

Figure 2A:
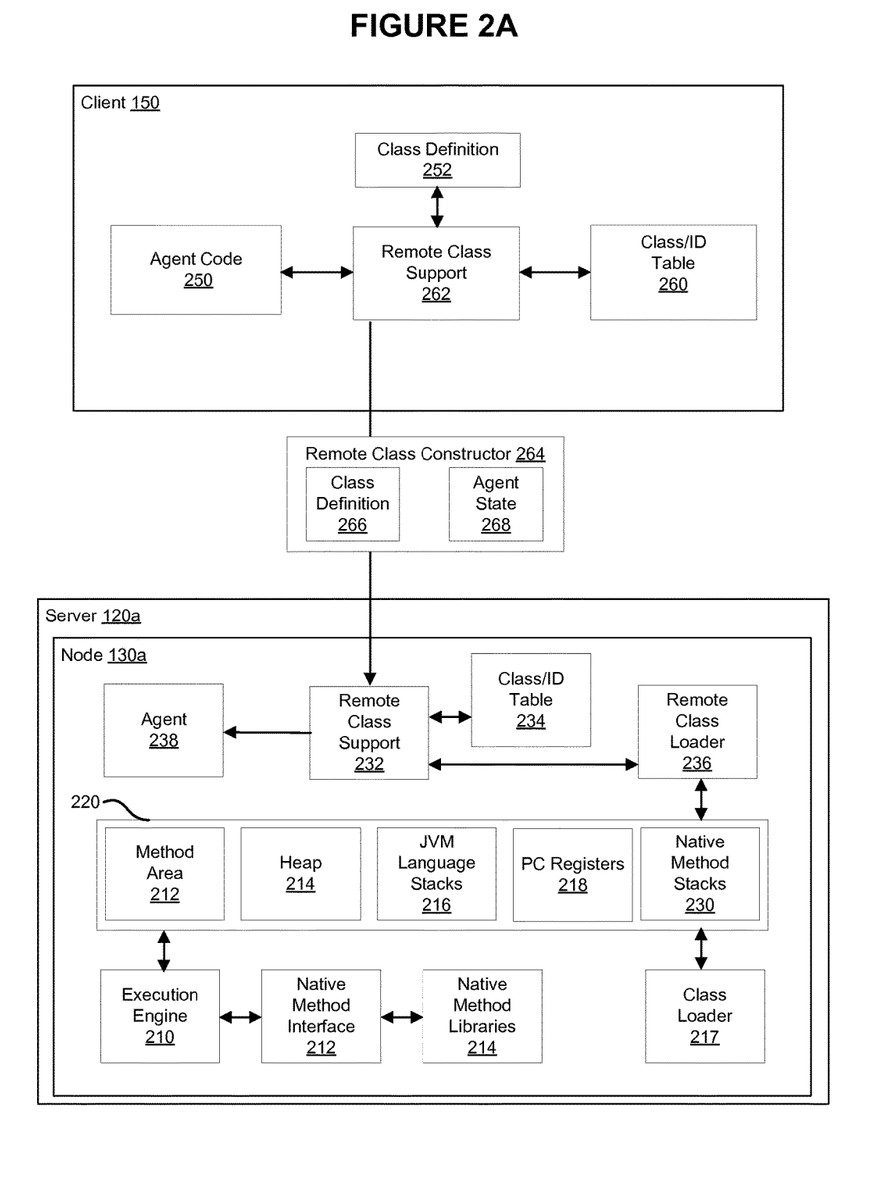
FIG. 2A illustrates a distributed computing environment supporting dynamic deployment of executable code, in accordance with an embodiment of the invention.

FIG. 2A, illustrates a system for dynamic deployment of a new class definition from the client 150 to a node 130a of the distributed data grid to enable an agent which utilizes the new class definition to be realized on the node. Although only one client and one node are shown, the same functionality can be applied on all clients and nodes of the distributed data grid. As shown in FIG. 2A, node 130a is implemented as a Java Virtual Machine (JVM). For example, an Oracle® JRockit JVM, IBM® JVM, Oracle® JVM or another vendor implementation of JVM. Node 130a, includes execution engine 210, native method interface 212, native method libraries 214, and class loader 217. Node 130a has a JVM memory area 220, which includes method area 212, heap 214, JVM language stacks 216, PC registers 218, and native method stacks 230. Upon startup of node 130a, class loader 217 loads and prepares and initializes classes based on class definitions found in the class path for the JVM. Client 150 is provided with remote class support 262 and node 130a is provided with remote class support 232. The remote class support functionality allows for dynamic deployment of new class definitions from the client 150 to a node 130a of the distributed data grid using a remote class constructor 264 transmitted over-the-wire from the client 150 to the node 130a as described below.

As shown in FIG. 2A, a user of a client system 150 can prepare agent code 250 for an agent to be operated on node 130a. Agent code can include a new class definition 252, which is either a definition of a new class having a new class name or an updated definition for a class (i.e. the class is preexisting). Note that even where the class definition is changed it is technically a new class with a new class definition from the client's perspective. The preexisting class on the client cannot be modified—instead a new class including any changes is implemented. When agent code 250 is attempted to be sent for execution on node 130a, remote class support 262 examines the agent code 250 to determine whether it includes any new class definition 252. Where one or more new class definition 252 is found, remote class support 262 prepares remote class constructor 264 for new class definition 252. Remote class constructor 264 includes new class definition 266 and the captured agent state 268 required to construct an instance of the agent on the node 130a. The remote class constructor 264 is used for wire transport for the new class and enables automatic serialization of the new class definition for transmission over-the-wire to node 130a.

Remote class support 262 utilizes a class/ID table 260. Class/ID table 260 includes a class identifier for each preexisting class based on the class name and a hash function (for example an MD5 hash) of the class definition.

This ensures that the identifier for each class is unique. Moreover, where a class definition is updated, the hash ensures that a new identifier will be assigned and thus the updated class will have a new class identity. Thus, using the class/ID table 260, remote class support 262 can determine whether agent code 250 includes any new class definition 252.

Remote class support 262 thus determines, using the class/ID table 260, whether any new class definition 252 is utilized in agent code 250. If all classes are preexisting on the node, remote class support just returns the identity of the class (which can be executed on node 130*a*). However, if a new class definition 252 is utilized by the agent code 250, (i.e. the class is unavailable on the node), then a new class definition 252 is prepared and a new identity corresponding to the new class definition 252 is stored in Class/ID table 260. A remote class constructor 264 is prepared representing the new class definition 266 and the captured agent state 268 required to realize the agent on the node 130*a*. The remote class constructor instance is automatically serialized and transmitted over-the-wire to node 130*a*.

The remote class constructor 264 is received by the node 130*a* and processed by remote class support 232. Remote class constructor 264 is automatically deserialized when it is received over-the-wire from client 150. Node 130*a* also maintains its own Class/ID Table 260 for validating class identities. Using the deserialized remote class constructor 264 and the remote class support 232, node 130*a* prepares a class loader for new class definition 266, loads the class into JVM memory 220, and initializes an instance of the new class in the JVM. Node 130*a*, is thus enabled to execute code utilizing the class instance based on the new class definition. Remote class support 232 is thus enabled to realize agent 238 for execution on node 130*a*.

Figure 2B:
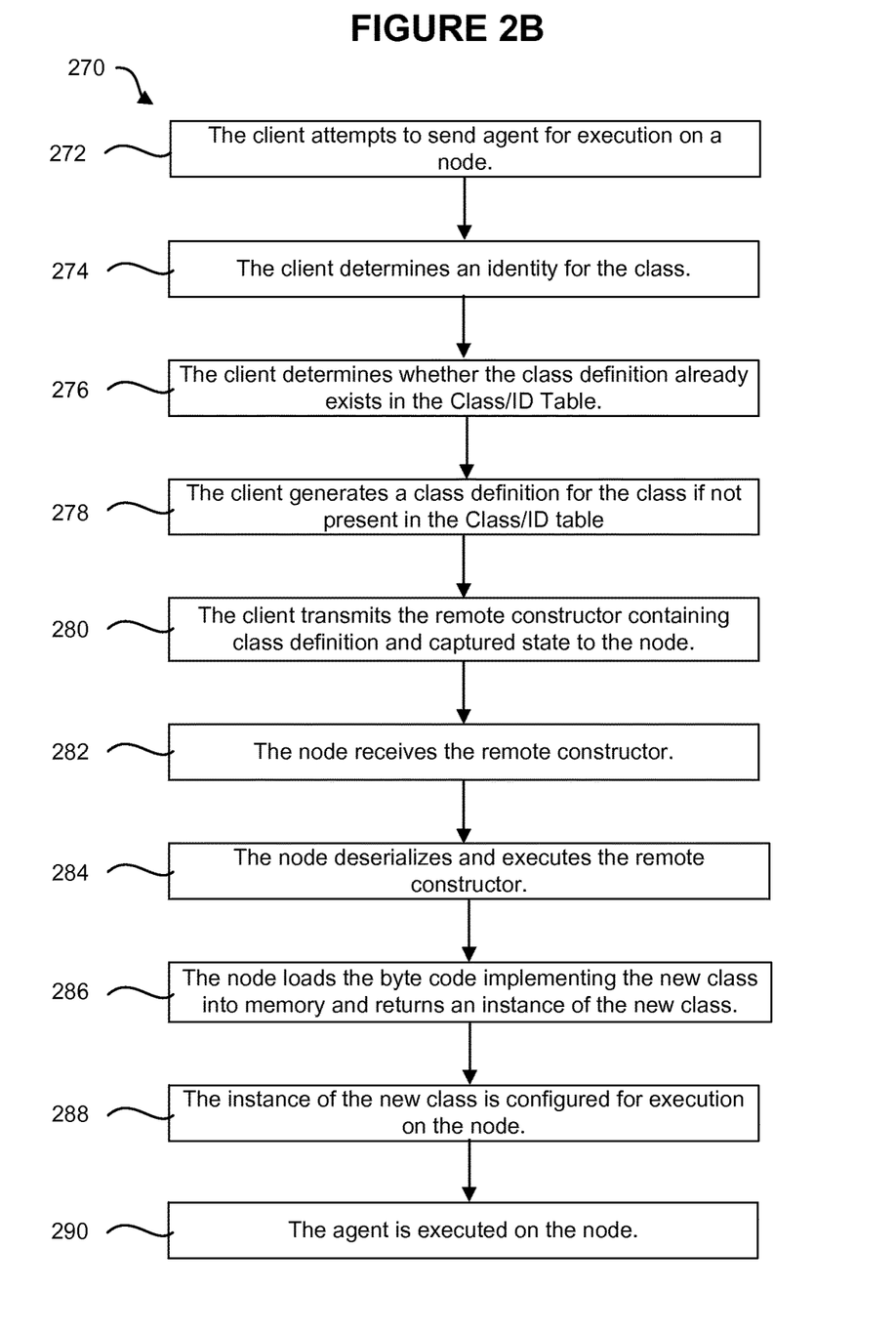
FIG. 2B illustrates a method supporting dynamic deployment of executable code, in accordance with an embodiment of the invention.

FIG. 2B illustrates a method 270 for dynamic deployment of new or updated class definitions from the client 150 to a node 130*a* of the distributed data grid. At step 272, the client attempts to send an agent for execution on a node. At step 274, the client determines an identity for the class. The identity is unique and thus the client can determine at step 276 whether the class already exists by comparing the identity to identities previously stored in the Class/ID table. If the identity does not match a class in the Class/ID table, the class must be a new or updated class.

At step 278, if the class is a new or updated class (identity not present in the Class/ID table), the client generates a new class definition for the class. A remote constructor is prepared on the client. The remote constructor includes the new class definition and the captured state of the agent required to realize the agent on the node. The remote class constructor instance is automatically serialized and transmitted over-the-wire to the node in step 280.

At step 282 the node receives the remote constructor over-the-wire from the client. At step 284, the remote constructor is deserialized and executed on the node. At step 286, the new class definition and the captured agent state required to realize the agent is loaded into JVM memory to create an instance of the new or updated class on the node. At step 288, the instance of the new or updated class is made available for execution on the node in order to realize the agent on the node. Note that where the class definition is changed on the client it is technically a new class with a new class definition from the client's perspective. The preexisting class on the node cannot be modified—instead a new class (having a new class identity) including the changes is implemented. At step 290, the agent is executed on the node.

Accordingly, the method allows dynamic deployment of a new or updated class definition from the client to the node in order to permit implementation of such new or updated class without requiring redeployment of the node/JVM. This dynamic deployment of new or updated classes with requiring redeployment of the node/JVM enhances the utility of the distributed data gird to execute agents and eliminates the need to restart nodes when new or updated class definitions are required.

Dynamic Deployment of Class Definitions Implementing Lambdas

In an embodiment, the system and method for dynamic deployment of class definitions can be used for class definitions associated with lambda expressions. In recent years, object-oriented programming languages such as Java™ have become increasingly popular for a wide variety of applications running on many different types of platforms. Some programming languages may support "lambda expressions". In object-oriented programming languages, lambda expressions may be used as a lightweight mechanism for defining objects that have just one method and no state. The lightweight syntax for the lambda expression can be optimized for the common usage in various programming language environments. The Java™ programming language is an example of a lexically-scoped imperative programming language. Support for lambda expressions was introduced in the Java™ 8 programming language. Accordingly code for agents to be executed on nodes of a distributed data grid may in some cases include lambda expressions.

Lambda expressions are a lightweight way to describe functions that can be treated as values by a programming language. Lambda expressions can be anonymous methods, which are aimed at addressing the "vertical problem", or bulky syntax, by replacing the machinery of anonymous inner classes with a syntactically lighter-weight mechanism. Lambda expressions can be viewed as providing support for "code as data" in that methods can accept lambdas (functions) as arguments and return them as a result. A lambda expression is like a method: it provides a list of formal parameters and a body—an expression or block—expressed in terms of those parameters. Lambda expressions may be expressed using syntax such as the following:

(argument list)→body.

Aspects of the use of lambda expressions in the Java™ programming language are described, for example in the following U.S. Patent Applications which are incorporated herein by reference: U.S. patent application Ser. No. 13/779,536 entitled "SYSTEM AND METHOD FOR SUPPORTING COMPATIBILITY CHECKING FOR LAMBDA EXPRESSION" filed Feb. 27, 2014; U.S. patent application Ser. No. 13/677,001 entitled "TARGET TYPING OF OVERLOADED METHOD AND CONSTRUCTOR ARGUMENTS" filed Nov. 14, 2012; U.S. patent application Ser. No. 13/677,000 entitled "SYSTEM AND METHOD FOR INFERRING IMMUTABILITY OF PROGRAM VARIABLES" filed Nov. 14, 2012; U.S. patent application Ser. No. 13/779,557 entitled "SYSTEM AND METHOD FOR COMPILING LAMBDA EXPRESSION IN A PROGRAMMING LANGUAGE ENVIRONMENT" filed Feb. 27, 2013; and U.S. patent application Ser. No. 13/028,111 entitled "BINDING-BASED CHARACTERIZATION OF CLOSURES IN SOFTWARE PROGRAMS" filed Feb. 15, 2011.

Lambda expressions are "anonymous" in that they are not named. Thus, Lambda expressions enable definition of anonymous methods, and enable treating such anonymous methods as instances of functional interfaces. The use of functional interfaces with anonymous inner classes is a common pattern in the Java™ programming language, thus the Java™ programming language leverages functional interfaces to implement lambda expressions. In the Java™ 8 programming language, a lambda expression can be described as a stripped-down form of the anonymous class declaration in which the parameter of the lambda expression is the same as the parameter to the anonymous class declaration's method, and the body of the lambda expression is the same as the body of the anonymous class declaration's method (but is able to elide the 'return' keyword because the only thing this particular lambda expression's body does is return a value). The expression-body form eliminates the need for a return keyword, which could otherwise represent a substantial syntactic overhead relative to the size of the expression. Thus, in the Java™ 8 programming language, lambda expressions are implemented in terms of class definitions for functional interfaces.

Described herein are systems and methods that can support dynamic deployment of classes implementing lambdas in a distributed computing environment including, for example, the distributed data grid of FIG. 1. As described above, the distributed data grid supports performance of transaction using an agent operating on the nodes of the distributed data grid. The code for such agents may include lambda expressions. However, in prior implementations, classes used in an agent had to be available (pre-existing) in the class path for each cluster node—this precluded the use lambdas in agents unless the class implementing the lambda had previously been deployed to the nodes of the distributed data grid (or the nodes were redeployed). For the server to actually process the lambda expression required the same compiled code in both the client and server class path. That is the server must have a class corresponding to the lambda expression in the server class path. Any changes or introduction of new lambdas on the client required redeployment and restart of both the client and the server in order to deploy a new class corresponding to the lambda expression to the server. This is very cumbersome and time consuming for large clusters.

In order to overcome this limitation, in embodiments of the present invention, the client transmits not only the metadata describing the lambda expression for use in an agent, but also, the actual class definition for the class implementing the lambda expression. Dynamic deployment of classes implementing lambda expressions can be performed as a particular case of the dynamic deployment of class definition described above. At the server, the class definition received from the client is parsed and a new lambda class generated from it for use in the agent/entry processor. The server defines a lambda class based on the class definition received from the client and executes it. This allows modification of the existing lambda expressions or the introduction of new lambda expressions without the need for redeployment or server restart to place the compiled code for the lambda expression in the class path.

Figure 3A:
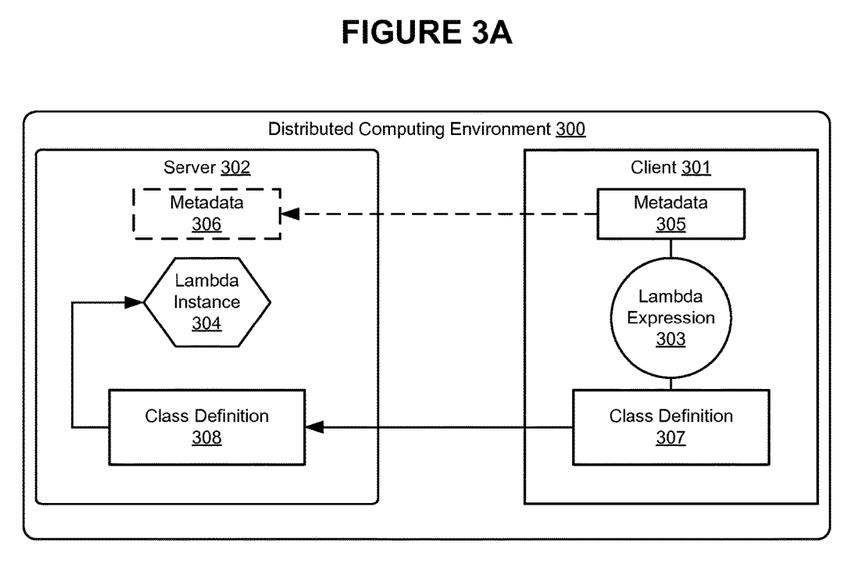
FIG. 3A illustrates a distributed computing environment supporting dynamic deployment of executable code implementing lambda expressions, in accordance with an embodiment of the invention.

FIG. 3A shows an illustration of a system supporting dynamic lambdas in a distributed computing environment, in accordance with an embodiment of the invention. As shown in FIG. 3, the distributed computing environment 300, such as a distributed data grid, includes a client 301 and a server 302. In an embodiment, the distributed computing environment may be a distributed data grid 100 as shown in FIG. 1, in which client 301 represents one or more of clients 150 and server 302 represents one or more of nodes 130a, 130b, 130c, 130d, and 130e.

As described above, in prior embodiments without dynamic deployment of class definitions, only the metadata 305, which describes the lambda expression 303, was sent over from the client 301 to the server 302. Then, the server 302 can take advantage of the lambda expression 303 on the client side based on the received metadata 306. It was the responsibility of the server 302 deserializing the received metadata 306 to determine how to locate and load the necessary class files for the static lambda. The class files therefore need to have already been deployed on the server 302 and also be the same as on the client 301 (i.e. not changed/updated on the client). Thus, any changes or introduction of new lambdas on the client side require a redeployment and/or a restart of both the client 301 and the server 302 before they could be invoked on the server 302 by the client.

On the other hand, in embodiments of the present invention which enable the use of dynamic deployment of class definitions, when the new or updated class definitions are used to implement lambdas, the client 301 generates one or more class definition 307 to execute from the lambda expression 303, and sends the class definition 307 to the server 302 in the distributed computing environment 300. After the server 302 receives the class definition 308 to execute, the server 302 defines a lambda instance 304 on the server side, based on the received class definition 308, and then executes the lambda instance 304 defined by the received class definition 308. Additionally, if the client 301 updates the lambda expression 303 on the client side, e.g. when the lambda expression 303 is modified or is introduced with a new behavior, a new class definition 307 can be prepared and transmitted to the server 302 and a new lambda instance can be created and executed having the new behavior.

Figure 3B:
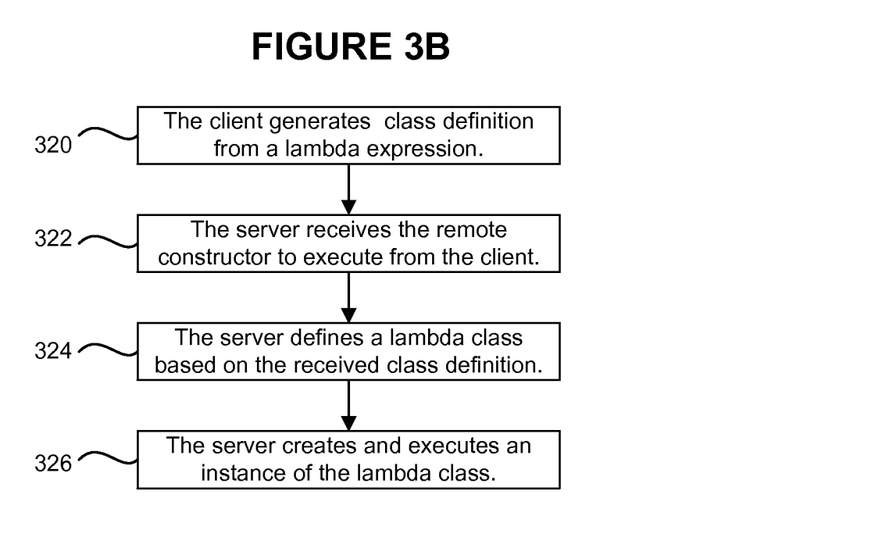
FIG. 3B illustrates a method supporting dynamic deployment of executable code implementing lambda expressions, in accordance with an embodiment of the invention.

FIG. 3B illustrates a method for supporting dynamic lambdas in a distributed computing environment. At step 320, the client generates said class definition from a lambda expression. At step 322, the server receives the class definition to execute from a client. At step 324, the server defines and loads a lambda class on the server-side based on the received class definition. At step 326, the server creates and executes the lambda instance defined on the server-side based on the received class definition. If the lambda expression is updated on the client side the process is repeated from steps 320 to 326 using a new class definition based on the updated lambda expression and resulting in a new lambda class definition and instance on the server side.

While various embodiments of the present invention have been described above, it should be understood that they have been presented by way of example, and not limitation. It will be apparent to persons skilled in the relevant art that various changes in form and detail can be made therein without departing from the spirit and scope of the invention.

It is also noted that, while for purposes of illustration, the above description is provided largely in the context of using the Java™ programming language (or a language closely related to Java™), the techniques described may be used for any programming language that supports Lambda expressions, overloading of invocation operations such as methods, constructors, or functions. The techniques may be used for object-oriented languages in some embodiments, or for non-object-oriented languages (such as various procedural languages) in other embodiments.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting dynamic deployment of executable code from a client to a node in a distributed computing environment, the method comprising:
 receiving at the node a serialized object from the client, wherein the serialized object comprises:
  a class definition of a new class not present in a class path of the node and including at least part of a definition of the new class from a class file that defines the new class on the client, and
  a captured state of an agent utilizing said new class;
 deserializing the serialized object on the node to retrieve said class definition of the new class and said captured state of the agent;
 loading the class definition of the new class and captured state of the agent in memory of the node;
 generating an instance of the new class on the node using the class definition of the new class loaded in the memory of the node; and
 executing the agent on the node.

2. The method of claim 1, wherein said class definition implements a lambda expression.

3. The method of claim 1, further comprising:
 receiving agent code on the client;
 determining the class definition for said new class from said agent code on the client; and
 generating a class identity for said new class based on the class definition.

4. The method of claim 1, further comprising:
 maintaining a class/identity table on said client;
 receiving agent code on the client for said agent;
 determining the class definition for said new class from said agent code on the client;
 generating a class identity for said new class based on the class definition; and
 using the class/identity table to determine that said new class is not present in the class path of the node.

5. The method of claim 1, further comprising:
 maintaining a class/identity table on said client;
 receiving agent code on the client for said agent;
 determining the class definition for said new class from said agent code on the client;
 generating a class identity for said new class based on the class definition;
 using the class/identity table to determine that said new class is not present in the class path of the node; and
 adding the class identity for said new class to the class/identity table.

6. The method of claim 1, further comprising:
 receiving agent code on the client for said agent;
 determining the class definition for said new class from said agent code on the client;
 generating on said client the serialized object comprising a class definition for a new class not present in the class path of the node and the captured state of an agent utilizing said new class; and
 transmitting said serialized object to the node.

7. The method of claim 1, further comprising:
 receiving agent code on the client for said agent, wherein said agent code includes a lambda expression;
 determining the class definition for said new class from said agent code on the client, wherein the class definition implements said lambda expression;
 generating on said client the serialized object comprising a class definition for a new class not present in the class path of the node and the captured state of an agent utilizing said new class; and
 transmitting said serialized object to the node.

8. The method of claim 1, wherein the distributed computing environment comprises a data grid cluster and wherein dynamic deployment of executable code enables execution of the agent on a plurality of nodes in said data grid cluster holding data to be operated on by said agent without redeployment of said plurality of nodes in said data grid cluster.

9. The method of claim 1, wherein the distributed computing environment comprises a data grid cluster and wherein said agent is an entry processor for execution against data held in said node.

10. The method of claim 1, wherein the distributed computing environment comprises a data grid cluster and wherein said agent is one of an aggregator, a filter, a value extractor, and an invocable, for execution against data held in said node.

11. A system for supporting dynamic deployment of executable code in a distributed computing environment, the system comprising:
   a computer system comprising a microprocessor and a memory;
   a node deployed on said computer system as part of said distributed computing environment; and
   wherein said node is configured to,
      receive a serialized object from a client, wherein the serialized object comprises:
         a class definition of a new class not present in a class path of the node and including at least part of a definition of the new class from a class file that defines the new class on the client, and
         a captured state of an agent utilizing said new class,
      deserialize the serialized object on the node to retrieve said class definition and said captured state of the agent,
      load the class definition of the new class and captured state of the agent in a portion of said memory allocated to said node;
      generate an instance of the new class on the node using the class definition of the new class loaded in the memory of the node, and
      execute the agent on the node.

12. The system of claim 11, wherein said class definition implements a lambda expression.

13. The system of claim 11, further comprising:
   a client computer system comprising a microprocessor and a memory; and
   a client operating on said client computer system, wherein said client is configured to, receive agent code for said agent,
      determine the class definition for said new class from said agent code; and
      generate a class identity for said new class based on the class definition.

14. The system of claim 11, further comprising:
   a client computer system comprising a microprocessor and a memory; and
   a client operating on said client computer system, wherein said client is configured to, maintain a class/identity table,
      receive agent code for said agent,
      determine the class definition for said new class from said agent code,
      generate a class identity for said new class based on the class definition, and
      use the class/identity table to determine that said new class is not present in the class path of the node.

15. The system of claim 11, further comprising:
   a client computer system comprising a microprocessor and a memory; and
   a client operating on said client computer system, wherein said client is configured to,
      maintain a class/identity table,
      receive agent code for said agent,
      determine the class definition for said new class from said agent code,
      generate a class identity for said new class based on the class definition,
      use the class/identity table to determine that said new class is not present in the class path of the node, and
      add the class identity for said new class to the class/identity table.

16. The system of claim 11, further comprising:
   a client computer system comprising a microprocessor and a memory; and
   a client operating on said client computer system, wherein said client is configured to,
      maintain a class/identity table,
      receive agent code for said agent,
      determine the class definition for said new class from said agent code,
      generate the serialized object comprising a class definition for a new class not present in the class path of the node and the captured state of an agent utilizing said new class, and
      transmit said serialized object to the node.

17. The system of claim 11, further comprising:
   a client computer system comprising a microprocessor and a memory; and
   a client operating on said client computer system, wherein said client is configured to,
      maintain a class/identity table,
      receive agent code for said agent wherein said agent code includes a lambda expression,
      determine the class definition for said new class from said agent code wherein the class definition implements said lambda expression,
      generate the serialized object comprising a class definition for a new class not present in the class path of the node and the captured state of an agent utilizing said new class, and
      transmit said serialized object to the node.

18. The system of claim 11, wherein the distributed computing environment comprises a data grid cluster and wherein dynamic deployment of executable code enables execution of the agent on a plurality of nodes in said data grid cluster holding data to be operated on by said agent without redeployment of said plurality of nodes in said data grid cluster.

19. The system of claim 11, wherein the distributed computing environment comprises a data grid cluster and wherein said agent is one of an entry processor, an aggregator, a filter, a value extractor, and an invocable, for execution against data held in said node.

20. A non-transitory computer readable medium including instruction stored thereon for supporting dynamic deployment of executable code from a client to a node in a distributed computing environment, which instructions, when executed cause the node to perform steps comprising:
   receiving at the node a serialized object from the client, wherein the serialized object comprises:
      a class definition of a new class not present in a class path of the node and including at least part of a definition of the new class from a class file that defines the new class on the client, and
      a captured state of an agent utilizing said new class;
   deserializing the serialized object on the node to retrieve said class definition of the new class and said captured state of the agent;
   loading the class definition of the new class and captured state of the agent in memory of the node;
   generating an instance of the new class on the node using the class definition of the new class loaded in the memory of the node; and
   executing the agent on the node.

* * * * *